United States Patent [19]

Otto et al.

[11] Patent Number: 4,632,809

[45] Date of Patent: Dec. 30, 1986

[54] APPARATUS FOR THE CRYSTALLIZATION/SEPARATION OF MATERIAL MIXTURES

[75] Inventors: Wilfried Otto, Wolfenbüttel; Hatto Papendieck, Erkerode; Harald Konradt, Wolfenbüttel; Claus-Henning Röder, Braunschweig, all of Fed. Rep. of Germany

[73] Assignee: Schering Aktiengesellschaft, Berlin, Fed. Rep. of Germany

[21] Appl. No.: 609,559

[22] Filed: May 11, 1984

[30] Foreign Application Priority Data

May 11, 1983 [DE] Fed. Rep. of Germany ....... 3317537

[51] Int. Cl.⁴ ............................................. B01D 9/04
[52] U.S. Cl. .................... 422/254; 422/257; 23/296; 62/539; 62/540; 62/544; 260/701
[58] Field of Search ................. 23/296; 422/245, 251, 422/254, 257; 62/538, 541, 542–544, 539, 540; 260/701; 165/94

[56] References Cited

U.S. PATENT DOCUMENTS

| | | | |
|---|---|---|---|
| 919,616 | 4/1909 | Monti | 62/542 |
| 2,196,594 | 4/1940 | Muskat | 23/296 |
| 2,981,773 | 4/1961 | Weedman | 23/296 |
| 3,093,649 | 6/1963 | Ratje et al. | 23/296 |
| 3,103,792 | 9/1963 | Davids | 62/544 |
| 3,305,320 | 2/1967 | Weech | 422/251 |
| 3,357,196 | 12/1967 | Dutcher et al. | 62/539 |
| 3,461,679 | 8/1969 | Goldberger | 23/296 |
| 3,628,341 | 12/1971 | Klotz et al. | 62/539 |
| 3,845,230 | 10/1974 | Dwyer, Jr. | 62/544 |
| 3,973,623 | 8/1976 | Sarll | 165/94 |

*Primary Examiner*—David L. Lacey
*Attorney, Agent, or Firm*—Michael J. Striker

[57] ABSTRACT

A crystallization/separation apparatus is disclosed for material mixtures having vertical crystallization column, cooling and heating devices, feeding-in and withdrawal connections, pumps, valves, connecting conduit tubings and drive motor, a cylindrical tube contains perpendicular aisles, rotatable at a central axis. The tube is distributed into segment-shaped chambers by said aisles, each substantially the same size. Also disclosed is a method for the separation of material mixtures.

15 Claims, 3 Drawing Figures

APPARATUS FOR THE CRYSTALLIZATION/SEPARATION OF MATERIAL MIXTURES

BACKGROUND OF THE INVENTION

The invention concerns a process and an apparatus for the separation of material mixtures by way of crystallization.

In particular, the apparatus employs a substantially vertically disposed crystallization column, cooling and heating assemblages, feeding-in and withdrawal connections, pumps, valves, connected conduit tubes and a driving motor.

It is known from the prior art how to separate material mixtures by means of distillation, extraction or crystallization. Such known separation and purification techniques have many possible uses. However, it is known to one skilled in the art that for many material mixtures, such separation and purification processes are extraordinarily expensive and are often unsatisfactory.

Thus, for example, a process is known from CH-PS 501,421 for the separation of melt-liquid or of dissolved substances from material mixtures by means of a single or multi-stage fractionating crystallization procedure occurring along a wall. The starting material for such process is provided in the form of a liquid film that remains fluid during the said techniques.

The material separation following this known procedure is performed in a discontinous manner and without the aid of mechanical adjuvants. The walls of the liquid phase are provided as a ripple/percolating film. In order for cystallization to occur, the crystallizate must adhere well to such walls. Only then can a separation of the crystallizate and the mother liquor be effected. Since such adherence does not always result, the value of employing this process is limited.

SUMMARY OF THE INVENTION

It is therefore an object of the present invention to make available an apparatus and a process by which a material mixture can be separated whereby certain components of the mixture may be recovered with a high level of purity.

This object is attained according to the present invention by an apparatus comprising a crystallization column composed of a cylindrical tube defining about a central axis, perpendicular aisles which distribute the tube into segment-like chambers, each having substantially the same size.

According to a specific embodiment, the aisles may be defined by the presence of fins.

The invention itself, however, both as to its construction and its method of operation, together with additional objects and advantages, thereof, will be best understood from the following description of a specific embodiment when read in connection with the accompanying drawing.

BRIEF DESCRIPTION OF THE DRAWING

In the drawings, wherein similar reference characters denote similar elements throughout the several views.

Figure 1:
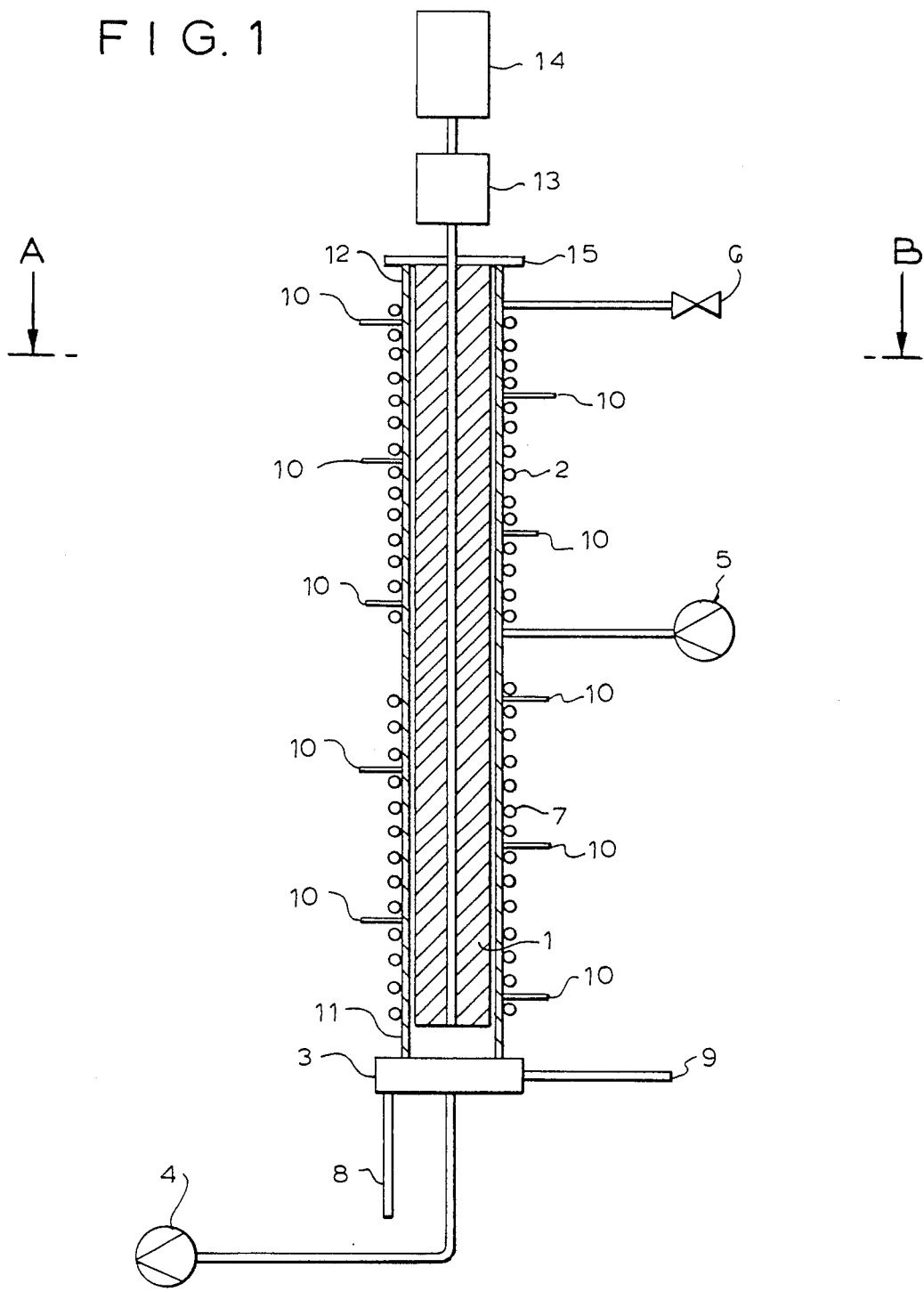
FIG. 1 is an elevational view of an embodiment of the crystallization/separation apparatus.
Figure 2:
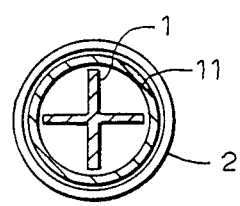
FIG. 2 is a plan view of an embodiment of the crystallization/separation apparatus.
Figure 3:
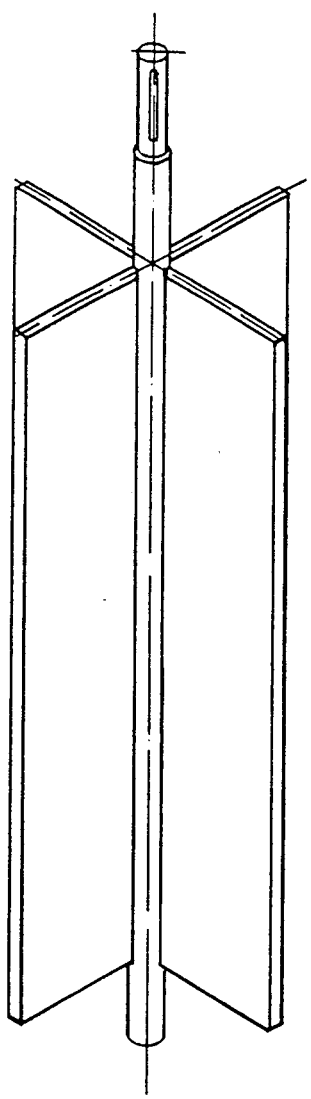
FIG. 3 is a perspective view of the defined rotating aisles an an example of a four-chamber system.

In the drawings, the following reference numerals are employed:

(1) Rotating aisle at the central axis.
(2) Cooling coils.
(3) Base plate, heatable.
(4) Withdrawal conduit
(4') Dosaging pump connected with the withdrawal conduit
(4") Another withdrawal conduit
(5) Feeding-in conduit
(5') Dosaging pump connected with the feeding-in conduit
(6) Valve
(7) Heating coil
(8) Drive means introduction
(9) Drive means exit
(10) Temperature measuring point
(11) Glass ring
(12) Columns-Tube
(13) Drive regulator
(14) Drive Motor
(15) Covering plate

DESCRIPTION OF THE PREFERRED EMBODIMENTS

Certain preferred embodiments of the present invention include the following:

The tube is distributed by the rotating aisles into a plurality of chambers, preferably, with from three to twenty such chambers being provided. Most advantageously, four chambers are provided.

With regard to the surface of the aisles, while no particular surface is required, preferably, the surface is smooth inasmuch as the aisles will not oppose the counter-stream principle resulting from counter flowing heated components of the material mixture having sedimenting crystals of the material mixture. Accordingly, it has been shown to often be advantageous for the aisles to display protruding fins, spaced projections, microfins and the like, depending upon the specific material mixture that is to be separated according to the present invention.

The fins defining the rotating aisles need not be composed from the same material as the central axis of the tube. When they are, these repective components are easily constructed in one piece, or alternatively, formed to be interconnecting. Preferably, the fins are, when not provided in such manner along with the tubing in one piece, pressed by spring means or the like, in plane bearing and fast to the tube surface. The spring means that are capable of being employed are well known to the artisan, i.e., leaf springs and coil springs, among others.

The length of the aisle defining fins is only limited by the length of the tube. The fins need not extend throughout the entire tube, thus the fins can each represent a single projecting unit, or a plurality of uniformly or variously shaped-sub-fins of each fin.

Preferably, however, the length of the fins corresponds substantially to the length of the tube.

As mentioned above, these fins are placed perpendicular with respect to the central axis of the tube. When substantially planar fins are employed, a likewise perpendicular arrangement is provided, vis-a-vis, the fins and the wall of the tube. Otherwise, for example, the fins are composed of a flexible material, or when they do not in an unflexed state, define such a planar volume, the relationship with the tube wall thereto, is preferably at an acute angle.

Regarding the tube itself, its relative dimensions can vary within substantially broad limits. Preferably, it has been shown to be advantageous by the method according to the present invention, wherein the diameter-to-length ratio of the tube lies between 1:1 and 1:25.

Most preferably, the ratio of diameter and length of the tube will be 1:10.

Cooling coil means frequently facilitate sedimentation of the material mixture. When this is desired, it is preferable for the coil means to be located in the upper part of the tube. Similarly, heating coil means find use, preferably, the lower part of the tube when it is desirable to expedite movement of the liquid mixture according to a counter-string principle relative with sedimenting/precipitating crystals coming down the tube. A Brachistochrone situation, preferred according to the present invention, in a most advantageously possible manner to effect the separation of the component parts of the material mixture.

Most common corrosion-fast materials, can be employed for the tube, according to the present invention. Depending upon the specific nature of the material mixture being separated, synthetic materials, e.g., plastics of most types, polyalklenes, polyamides, polyurethanes and, even polyureas in certain limited instances, either layered or substantially cross-linked, and combinations thereof. The same similarly applies to cellulose and cellulose derivative materials which are among the many materials from which the tube can be constructed.

In general, a non-porous or substantially closed surface will be indicated. However, where for purposes of materials-select addition to the counter-string principle, according to the present invention, is desired, for example, where medical-related material mixtures are being separated, it is frequently desirable that a porous or pore-gradient material be employed.

Examples of such systems include blood, urine, processing of glandular and other tissue abstracts, etc.

When frequent or periodic replacement of the apparatus or its components can be readily accomplished, corrosion-fast materials may be selected from non-synthetic materials, e.g. metals and alloys. In these instances, a preferred embodiment involves the employment of steel tubes.

The tube is provided at the upper and lower ends with removable covering plates.

Between the lower end of the tube and the bottom covering plate, it is preferable to insert insulating or protective ring means, these most preferably being formed of glass.

Heating aggregates located at the lower part of the tube probably contain deflecting plate means, e.g., a cowl subjacent to the heating surface.

For many applications, the cooling and heating aggregates are otherwise independent or non-connected with one another. However, it is a preferred embodiment for the cooling and heating aggregates to be connected through a heat pump.

The feeding-in connections and the withdrawal connections of the tube must be related insofar as the apparatus and method of use of the same are concerned. However, it is a preferred embodiment according to the present invention for the feeding-in connection(s) to be located in the middle part of the tube and the withdrawal connections to be each located at the lower part and the upper part of the tube.

Automatic regulation of the separations of material mixtures requires that frequent and position-precise measurements be taken. For this reason, it is preferred that temperature measurement places be distributed across the entire length of the tube.

The method according to the present invention for the separation of material mixtures may be thereby characterized in that the material mixture is fed into the middle part of the column as a melt and under constant rotation of the rotating aisles, whereupon the crystals separated at the cooled upper part of the column are removed from the column wall by means of the movement of the rotating aisles. These rotating aisles are extended into the counterflowing liquid material mixture in a counter-spring principle from the heated lower part of the column and into the chambers defined by the aisles until the material mixture has separated into its components; pure materials and corresponding mother liquor. By means of sedimentation of the material according to density variations, the separate components are removed at the lower or upper end of the column.

Particular embodiments of the method according to the present invention, include:

That the upper part of a column is adjusted to a temperature just below the melting point of those materials in the material mixture which display higher densities in contrast to the convoy material or material mixture;

That the lower part of the column is adjusted to a temperature above the melting point of the material having the higher density;

That the crystals traverse on their way from the upper to the lower part of the column a path corresponding to the curve of a hypo-cycloid;

That the method is performed continuously; and

That the treatment be repeated continuously in analogous arrangements, insofar as a separation of three- or multi-material mixture is involved.

The apparatus according to the present invention as well as the characterized method makes possible in a more advantageous manner a recovery of components from a material mixture and in higher degree of purity.

The apparatus according to the present invention, guarantees in surprising manner the separation of all material mixtures in which the solid phase of a substance has a higher density than its melt.

The apparatus and the method therefore offer utility for multi-substance systems with which known techniques, e.g., distillation, extraction and crystallization from solutions, heretofore employed presented great technical problems and with processes for which the highest product purity is desired, e.g., in vitro separation.

It is of particular technical significance that the method and apparatus according to the present invention are not only useful for the separation of eutectic-forming mixtures, but also mixed crystal systems.

It is a further advantage, according to the present invention, that the low energy expenditure and the lower process temperature levels involved reduce problems of chemical instability and the possibility of a dangerous explosive reaction occurring during operation.

Storage parameters such as diffusion and dendrite formation are extensively without influence since the apparatus according to the present invention, makes possible extraordinarily short crystallization periods whereby the concentration of impurities ahead of the crystallization front is close to a minimum. These short crystal formation periods are the basis for establishment of the extraordinarily high degrees of purity of at least 99.97% which can be obtained with the apparatus of the present invention.

The mechanical construction of the apparatus, according to the present invention is technically simple.

As preferred but not limiting embodiments of the design concept, fins effectively across the entire length are disposed at a central axis in the vertically mounted cylindrical tube which act as a scraping element. The rotating aisles distribute and divide the tube into chambers, the number of which can amount to two or more. A rotation about the main axis is facilitated for the liquid material mixture, the suspension as a result of the rotation of the aisles and in the chambers is formed by means of the fins. Fresh standing solution is then promoted from the anterior of the liquid at the crystal front and simultaneously therewith the formed crystals are scraped off and transported away. The path of a crystal in this rotating wall corresponds to the curve of a hypocycloid. Based upon their higher density, the crystals sink from the cooling zone and form in the lower part of the column a fluidization layer, which penetrates the corresponding volume of liquid that flows upwardly, counter to the crystals.

Since the scraping element causes no vortex, an axial inter-mixing is extensively avoided. The melt which is formed in place, anew, by means of the base heating of sedimented crystals flows from below through the ringlet crystallizate and washes in counter-string principle against the mother liquor adhering to the sinking crystals.

This operation is performed in a continuous manner until a final separation. The recycle ratio, if desired, can be varied optionally by means of adjusting the amount of introduced heat and the withdrawal amount. Expediently, a range of about 1 to 10 is selected for this purpose.

The inventive method proceeds substantially as follows:

In the non-stationary drive phase the column is filled with the material mixture to be liquified by means of a pump which is installed parallel to the dosaging pump, across the lower feeding-connection, to such an extent that the liquid melt flows out from the upper withdrawal connection. The motor is then turned on so that it uniformly drives the rotating aisles across the driving regulator. It should be noted that it is important that the speed of rotation be held down. Moreover, the cooling arrangement for the operation of the cooling coils means is turned on and adjusted to the appropriate temperature level which can be controlled at the temperature measuring areas of the invention.

After a short period, crystallization begins at the upper part of the coil at the interior wall, whereupon the scrapper removes the forming crust from the wall. The scraped off crystals sink downwardly based upon their higher density, uniformly into the rotating chamber, where they form at the lower part of the column, a fluidization bed that is easily visible through the glass ring. To the extent that an extensive fluidization bed by agitation has been formed, which can itself, extend to the middle of the column depending upon the employed material mixture, the heating arrangements for operation of the heating coil and the lower base plate is turned on, whereby a melting of the crystals is effected. The precipitation layer travels under its characteristic weight into with the melt zone and penetrates the freshly formed melt. The melt, for its part, then penetrates the liquid which previously adhered to the crystals, and fluctuates upwardly through the agitation belt and washes herewith in counter-stream principle. The mother liquor adheres to the sinking crystals. Indeed according to the size of the plant and the specific material mixture to be separated, the apparatus requires several hours until the desired separation of the mixture has been effectuated and recognizable by concentration gradients, which can be determined by way of the increases in temperature at the temperature measuring places. With a discontinuous operation, the components can be withdrawn at the upper or at the lower withdrawal connections with care that no inter-mixing occurs.

Insofar, as however, a continuous operation is desirable, after establishment of the concentration gradient, the dosaging pump(s) is turned on. These pumps provide additional material mixture to be liquified by feeding-in at the middle part of the column, while the withdrawal of pure substance at the lower and/or at the upper column parts across their arranged connections continues. Such an operation is capable of being performed in a practically unlimited manner.

Since the apparatus according to the present invention naturally is adaptable to the separation of two components in the event of a desired separation, from three or greater multi-material mixtures further analogous arrangements can be provided into which one would subject the non-separated mixture yet again a first separation to a further separation.

As material mixture, suitable according to the present invention, mention may be made of the following substances that can be separated or purified:

Fiber pre-products, such as p-xylol, adipic acid, pharmaceutical raw materials and plant protection agents, natural substances, base chemicals, isomers, such as chlorinated or nitrated aromatics, phenol derivatives, such as p-cresol.

It will be understood that each of the elements described above, or two or more together, may also find useful application in other types of separation differing from the types described above.

Thus, while only several embodiments of the present invention have been shown and described, it will be obvious that many changes and modifications may be made thereunto, without departing from the spirit and scope of the invention.

We claim:

1. Apparatus for the crystallization/separation of a material mixture, comprising:
    a vertical crystallization column having an upper end and a lower end and an inner surface, a cooling coil and a heating coil positioned therearound, upper and lower covering plates, a feeding-in conduit connected to said column for feeding said material mixture into said column, at least one withdrawal conduit connected to said column; a feeding element connected with said feeding conduit and a withdrawal element connected with said at least one withdrawal conduit;
    drive motor means located along said vertical crystallization column; and
    a rotating aisle member including a plurality of fins which are constructed and arranged on said aisle member so as to distribute said material mixture into substantially segmented-shaped chambers of approximately equal size, and said aisle member being disposed in said vertical crystallization column and connected to said drive means so as to be driven by said drive means and being disposed about the central axis of said vertical crystallization column.

2. The apparatus according to claim 1, where said plurality of fins includes a number of fins to define between three and twenty of said segmented-shaped chambers.

3. The apparatus according to claim 2, wherein said plurality of fins includes a number of fins to define four chambers.

4. The apparatus according to claim 1, wherein said rotating aisle member has a smooth surface.

5. The apparatus according to claim 1, further comprising spring means disposed within said column, said spring means being positioned to press said fins evenly upon the inner surface of said column.

6. The apparatus according to claim 5, wherein said plurality fins and said column are substantially of the same length.

7. The apparatus according to claim 1, wherein said plurality fins are disposed at an acute angle with respect to the inner surface of said column.

8. The apparatus according to claim 1, wherein the ratio of the diameter-to-length of said column is 1:1 to 1:25.

9. The apparatus according to claim 8, wherein said diameter-to-length ratio is 1:10.

10. The apparatus according to claim 1, wherein said column is made of a corosion-fast material.

11. The apparatus according to claim 10, wherein said corrosion-fast material is steel.

12. The apparatus according to claim 1, further comprising an insulating ring means between said lower end of said column and said lower covering plate.

13. The apparatus according to claim 12, wherein said insulating ring means is a glass ring.

14. The apparatus according to claim 1, further comprising a plurality of temperature measuring points distributed along the total length of said column.

15. The apparatus according to claim 1, wherein said feeding-inconduit is located at substantially a center of said column and said withdrawal conduit is located at the lower end of said column, and wherein said at least one withdrawal conduit includes a withdrawal conduit located at the upper end of said column.

* * * * *